United States Patent [19]
Lee et al.

[11] Patent Number: 5,656,212
[45] Date of Patent: Aug. 12, 1997

[54] PROCESS FOR THE PREPARATION OF SIC WHISKER-REINFORCED CERAMIC COMPOSITE MATERIALS

[75] Inventors: Hae-Weon Lee; Hyung-Woo Jun; Huesup Song; Sang-Woo Kim, all of Seoul, Rep. of Korea

[73] Assignee: Korea Institute of Science and Technology, Seoul, Rep. of Korea

[21] Appl. No.: 496,204

[22] Filed: Jun. 28, 1995

[30]    Foreign Application Priority Data

Jun. 29, 1994 [KR] Rep. of Korea ............ 94-15129

[51] Int. Cl.$^6$ ............... B05B 3/00; B29C 59/00
[52] U.S. Cl. ............ 264/28; 264/640; 264/667
[58] Field of Search ............ 264/28, 60, 122

[56]           References Cited

U.S. PATENT DOCUMENTS

| | | | |
|---|---|---|---|
| 4,839,316 | 6/1989 | Tiegs ............................ | 501/89 |
| 5,009,822 | 4/1991 | Sacks et al. .................. | 264/23 |
| 5,106,793 | 4/1992 | Greil et al. .................... | 501/97 |

OTHER PUBLICATIONS

Ceramic Transactions, vol. 1, Part A, pp. 397–409, 1988, C.S. Khadilkar, et al., "Effect Of Poly(Vinyl Alcohol) On The Properties Of Model Silica Suspensions".

Communications of the American Ceramic Society, pp. 267–269, Dec. 1984, Paul F. Becher, et al., "Toughening Behavior In SiC–Whisker–Reinforced Alumina".

J. Am. Ceram. Soc., vol. 71, No. 5, pp. 370–379, 1988, Michael D. Sacks, et al., "Suspension Processing of Al2O3/ SiC Whisker Composites".

Ceramic Bulletin, vol. 66, No. 2, pp. 333–338, 1987, Joseph Homeny, et al., "Processing And Mechanical Properties Of SiC–Whisker–Al2O3–Matrix Composites".

*Primary Examiner*—Christopher A. Fiorilla
*Attorney, Agent, or Firm*—Oblon, Spivak, McClelland, Maier & Neustadt, P.C.

[57]           ABSTRACT

A SiC whisker-reinforced ceramic composite is prepared by adding about 0.4 to 1.0% by weight of a nonionic polymer, polyvinylalcohol (PVA) to a heat-treated SiC whisker to obtain a SiC whisker slurry, mixing the SiC whisker slurry with a matrix slurry formed at about pH 4 followed by freeze-drying the resulting slurry mixture to produce granules having a uniform packing structure and hot pressing the granules.

4 Claims, No Drawings

PROCESS FOR THE PREPARATION OF SIC WHISKER-REINFORCED CERAMIC COMPOSITE MATERIALS

BACKGROUND OF THE INVENTION

1. Field of the Invention

The present invention relates to a process for the manufacture of SiC whisker-reinforced ceramic composite materials. More particularly, the present invention relates to a process for the manufacture of SiC whisker-reinforced ceramic composite materials having improved mechanical properties and process reproducibility by enhancing two-dimensional orientation of whiskers having geometrical anisotropy during hot pressing (sintering under uniaxial pressure).

2. Description of the Prior Art

SiC whisker-reinforced ceramics are composite materials which are useable as high-temperature structural materials as well as cutting tool materials.

Since, in hot pressing operation, pressure is applied in a uniaxial direction, the randomly-oriented whisker is subjected to rotational moment and tends to be arranged in a direction perpendicular to the applied pressure [G. C. Wei and P. F. Becher, "Development of SiC Whisker-Reinforced Ceramics," Am. Ceram. Soc. Bull., 64 [2] 298–304 (1985)]. However, the orientation of whiskers depend on packing density of a matrix material in a powder mixture, the amount of whisker added, aspect ratio and dispersibility of the whisker, etc.

Since the orientation of whiskers is likely to be restricted by direct contact with each other during hot pressing, it is very important in obtaining improved mechanical properties to add a maximum amount of whiskers having good dispersibility while minimizing the direct contact of whiskers before the hot pressing [J. V. Milevski, "Efficient Use of Whiskers in the Reinforcement of Ceramics," Adv. Ceram. Mat., 1[1] 36–41 (1986)].

Generally, it is known that the fracture of whisker-reinforced ceramic composite materials is caused by whisker clusters and large pores associated with the clusters, or whisker-deficient sites composed mainly of matrix material. That is, such destruction is mainly due to the aggregate of either whisker or matrix particles, which are produced owing to insufficient dispersion during the preparation of a mixed powder [P. D. Shalek et al., "Hot-Pressed SiC Whisker-$Si_3N_4$ Matrix Composites," Am. Ceram. Soc. Bull., 65[2] 351–56 (1986)]. The mixed powder thus prepared is usually filled in granular form to a graphite die, and hot-pressed. The microstructure of the granules in the mixed powder will affect the process defect generation and the mechanical properties of the hot-pressed body as well as the behavior of the contact and rearrangement of whisker during the hot-pressing. Namely, when the whiskers in the granules have direct contact with each other, the network structure formed by the whiskers may retard the densification of composite materials by hot-pressing, resulting in the aforementioned whisker clusters; this results in the degradation of the physical properties of the composite materials.

We, the inventors, have made extensive studies to overcome the problems mentioned above and have found that SiC whisker-reinforced ceramic composite materials having improved mechanical properties and process reproducibility can be produced by enhancing the two dimensional orientation of whisker having geometrical anisotropy during the hot-pressing.

SUMMARY OF THE INVENTION

It is, therefore, an object of the present invention to provide a process for the preparation of SiC whisker-reinforced ceramic composite materials having improved mechanical properties and process reproducibility.

It is another object of the present invention to provide an improved process for the preparation of SiC whisker-reinforced ceramic composite materials having maximized physical properties.

It is another object of the present invention to provide a process for maximizing the two dimensional orientation of whisker in the composite materials.

Further objects of the present invention will become apparent through reading the remainder of the specification.

DETAILED DESCRIPTION OF THE INVENTION

The primary object of the present invention can be attained by a process for the preparation of SiC whisker-reinforced ceramic composite materials having improved mechanical properties and process reproducibility, which comprises enhancing the two dimensional orientation of whiskers during hot pressing of the composite materials.

The second object of the present invention can be accomplished by a process for the preparation of SiC whisker-reinforced ceramic composite materials, which comprises the steps of a) adding about 0.4 to 1.0% by weight of a nonionic polymer PVA to a slurry of heat-treated SiC whisker to increase the amount of adsorbed PVA to a maximum and thus preparing a SiC whisker slurry having improved dispersibility, b) mixing said SiC whisker slurry with an alumina or alumina-zirconia slurry formed at pH 4 and removing the liquid vehicle, e.g. water, to produce a homogeneous mixtures, preferably by freeze drying and c) hot-pressing said mixtures.

The process of the present invention will be described in detail as follows.

Step a) is to prevent the direct contacts of whiskers and to disperse whiskers homogeneously with a steric barrier. In this step, the nonionic polymer PVA is adsorbed on the surface of the whiskers to enhance dispersion stability of whiskers and eventually to prevent early formation of whisker cluster during hot pressing.

SiC whiskers used in the present invention are known and are commercially available. Such whisker includes, for example, SCW-S105 which is a trade name for whiskers marketed by Tateho Chemical K. K., Japan.

PVA which can be used in Step a) of the present invention contains about 8–12% of hydrophobic acetate groups ($—CO_2CH_3$) between hydrophilic alcohol groups (—OH). Typically, such PVA forms an aqueous solution at room temperature whereby the mutual action between alcohol groups can be inhibited by acetate group. PVA may be added in an amount of about 0.4 to 1.0% by weight.

It is known that the surface of a whisker must have a site at which hydrophilic alcohol group and hydrophobic acetate groups may be adsorbed. The present invention overcomes such problem by heat treatment of whiskers, creating hydrophobic sites. The heat treatment can be carried out in an argon or air atmosphere at about 500° C. to 700° C. for about 1 hour. Heat-treatment in air can be carried out in a box-type electric furnace, while the heat-treatment under argon atmosphere can be carried out by flowing argon gas into a tube type electric furnace. Particularly, it is most preferable that the heat-treatment is carried out in air at about 700° C. for about 1 hour.

Step b) comprises mixing a matrix powder slurry with SiC whisker slurry as obtained in Step a) to prepare granules.

Matrix materials are known in the art and all known materials may be used in the present invention. The preferable materials include $Al_2O_3$ or $Al_2O_3/ZrO_2$. The matrix powder slurry is adjusted to pH 4, before mixing it with whisker slurry, to form an electrical double layer on its surface. The details concerning this method are described in M. D. Sacks, H. W. Lee, and O. E. Rojas, "Suspension Processing of $Al_2O_3$/SiC whisker Composites," J. Am. Ceram. Soc., 71[5] 370–379 (1988).

The treated matrix powder slurry is mixed with SiC whisker slurry prepared in step a) . Although both SiC Whiskers and matrix particles are dispersed by a steric barrier and electrical double layer, respectively, in slurry, mixing two slurries does not affect the dispersion state of both powders since PVA is nonionic. Thus, the co-dispersed slurry formed by mixing the two slurries can produce the granules in which the matrix material, $Al_2O_3$ or $Al_2O_3/ZrO_2$, has a uniform packing structure after granulation.

The granulation comprises first spraying the slurry into a hexane bath cooled with dry ice/acetone mixture using a pippette to freeze the liquid drops of mixed slurry and to produce the granules, recovering the frozen granules from the hexane, and then sublimating water from the frozen granules while maintaining the temperature at $-12°$ to $-6°$ C. under vaccum to obtain the dried granules.

In step c), whisker-reinforced ceramic composite materials having enhanced mechanical properties such as bending strength and fracture toughness are prepared by hot pressing the granule as produced in step b). The hot pressing method is known from G. C. Wei and P. F. Becher, "Development of SiC Whisker-Reinforced Ceramics," Am. Ceram. Soc. Bull. 64[2] 298–304 (1985). According to the present invention, the hot pressing can be carded out under argon at about 1,800° C. and about 45 MPa for about 40 to 60 minutes. By the above process, two dimensional orientation of whiskers is promoted, and thus the mechanical properties of the composite material such as SiC whisker/$Al_2O_3$ or SiC whisker/$Al_2O_3$//$ZrO_2$ are maximized and processing defects are minimized. Accordingly, the process reproducibility can be ensured.

The ceramic composite materials produced according to the present invention have the highest 4 points bending strength of 740 MPa and the fracture toughness increased by about 20%, as compared with that of the prior art.

DESCRIPTION OF THE PREFERRED EMBODIMENTS

The present invention will be illustrated in greater detail by way of the following examples. The examples are presented for illustration purposes only and should not be construed as limiting the invention which is properly delineated in the claims.

REFERENCE EXAMPLE 1

SiC whiskers (SCW-S105, available from Tateho Kagaku K. K., Japan) were heat-treated under air (or argon) at 500° C. to 700° C.. About 0.4 to 1.0% by weight of PVA was added thereto to prepare a slurry. The slurry was used to study the effect of heat treatment conditions and the amount of PVA to be added on the sedimentation packing density. The results are shown in Table 1 below.

TABLE 1

| Amount of PVA added (wt. %) | Sedimentation density (g/cm³) | | | |
|---|---|---|---|---|
| | 500° C., air | 500° C., argon | 700° C., air | 700° C., argon |
| 0.4 | 0.53 | 0.15 | 0.74 | 0.60 |
| 0.6 | 0.53 | 0.20 | 0.73 | 0.46 |
| 0.8 | 0.60 | 0.23 | 0.69 | 0.40 |
| 1.0 | 0.56 | 0.18 | 0.71 | 0.53 |

Table 1 shows that the slurry prepared from SiC whiskers which was heat-treated under air at 700° C. for 1 hr has the best dispersion stability.

REFERENCE EXAMPLE 2

A SiC whisker was heat-treated in the same manner as described in Reference Example 1. The amount of PVA adsorbed on the heat-treated SiC whisker was determined at 700° C. in air with the same mount of PVA as in Table 1 above. The results are shown in Table 2 below.

TABLE 2

| Amount of PVA added (wt. %) | Absorbed amount (mg PVA/g SiC) | |
|---|---|---|
| | Before heat-treatment | After heat-treatment (700° C., air) |
| 0.4 | 0.73 | 1.52 |
| 0.6 | 0.60 | 1.65 |
| 0.8 | 0.94 | 1.66 |
| 1.0 | 0.81 | 1.71 |

Table 2 shows that the amount of adsorbed PVA is increased by the heat-treatment of SiC whisker. This is because the heat-treatment of SiC whiskers increases hydrophobic sites which enhance the adsorption of hydrophobic acetate groups in PVA on the surfaces of whisker.

EXAMPLE 1

SiC whiskers were first prepared in the manner described in Reference Example 1. Then, about 3% by volume of an aqueous SiC whisker slurry obtained in Reference Example 1 was added to an aqueous $Al_2O_3$ slurry containing about 25% by volume of solid which has been prepared by using an $Al_2O_3$ powder (HPA-0.5AF available from Ceralox Company, U.S.A.). The resulting mixed slurry was freeze-dried to produce the mixed granules for hot pressing. In preparation of a mixed slurry, the $Al_2O_3$ slurry was adjusted to pH 4 with nitric acid to optimize its dispersibility ["Aqueous slurry" means that water ($H_2O$) was used as a liquid vehicle for the slurry preparation. "Aqueous slurry of pH 4" means that the pH of aqueous slurry was adjusted to pH 4 at which the dispersibility was good]. The granules thus prepared were charged into a die, and subjected to hot pressing at 1,800° C. and 45 MPa for about 40 to 60 minutes in argon atmosphere to prepare a SiC whisker (25% by volume)/$Al_2O_3$ composite material.

The SiC whiskers were heat treated under heat treatment conditions as in Reference Example 1, and then the bending strength and fracture toughness of the composite materials were measured to study the effect of heat treatment on the mechanical properties of the hot-pressed SiC whisker (25% by volume)/$Al_2O_3$ composite material under the various conditions. The existence of the whisker-deficient site which is the fracture origin of SiC whisker-reinforced ceramic composite material was investigated by scanning electron microscopy. The results are shown in Table 3 below.

TABLE 3

| Heat-treatment conditions | Bending strength (MPa) | Fracture toughness (MPa · m$^{1/2}$) | Existence of whisker-deficient site |
|---|---|---|---|
| Before heat-treatment | 623 (83) | 4.5 | Yes |
| 500° C., argon | 501 (81) | 4.1 | Yes |
| 500° C., air | 529 (68) | 4.1 | Yes |
| 700° C., argon | 604 (101) | 4.5 | Yes |
| 700° C., air | 742 (66) | 5.4 | No |

*The parentheses show the standard deviation.

Table 3 shows that the bending strength and fracture toughness of the hot pressed SiC whisker (25% by volume)/Al$_2$O$_3$ composite material was the highest when the SiC whisker was heat-treated under air at 700° C. The fracture origin of SiC whiskers (25% by volume)/Al$_2$O$_3$ composite materials prepared with SiC whisker heat-treated under other 4 conditions was mainly the whisker-deficient sites while no whisker-deficient sites were observed in the SiC whisker (25% by volume)/Al$_2$O$_3$ composite material prepared with the SiC whisker heat-treated under air at 700° C. The fracture origin in the latter was usually an inclusion. In addition, the SiC whiskers (25% by volume)/Al$_2$O$_3$ composite material prepared with SiC whisker heat-treated under air at 700° C. showed the lowest standard deviation of bending strength, and thus the best reproducibility of the hot pressing process.

Considering that the dispersion conditions of Al$_2$O$_3$ which is the matrix material used in the present invention are all identical, the dispersion condition of SiC whisker plays the most important role in obtaining good mechanical properties of SiC whiskers (25% by volume)/Al$_2$O$_3$ composite material. In addition, it is noted that the formation of whisker-deficient sites (so called as Al$_2$O$_3$ aggregates) is due to dispersion stability of SiC whiskers. Particularly, it has been known as a general theory that if the interface strength between SiC whiskers and Al$_2$O$_3$ is higher due to interfacial reactions between Al$_2$O$_3$ and SiO$_2$ on SiC whiskers, the fracture toughness will be reduced. Nevertheless, the fact that the fracture toughness of SiC whiskers (25% by volume)/Al$_2$O$_3$ composite material prepared with SiC whiskers heat-treated under air at 700° C. is high, means that the enhanced dispersion stability of SiC whisker promotes the orientation of SiC whiskers with preventing extensive network formation by SiC whiskers.

EXAMPLE 2

SiC whisker slurry prepared as described in Reference Example 1 was mixed with Al$_2$O$_3$/ZrO$_2$ (5 to 20% by volume) having a pH of 4, and the mixture was freeze-dried to produce the granules as described in Example 1. The granules were then hot-pressed at 1,650° C. to prepare a SiC whisker/Al$_2$O$_3$/ZrO$_2$ composite material. In this process, ZrO$_2$ powder containing 3 mol % of Y$_2$O$_3$ (TZ3Y available from Tosoh K. K.) was used. The obtained composite material was rested as described in Example 1. As a result, the composite material showed the excellent mechanical properties such as the bending strength of about 820 to 940 MPa and the fracture toughness of about 6.2 to 7.3 MPa·m$^{1/2}$. It was confirmed that the fracture origin of the SiC whisker-reinforced composite material was mainly inclusions, not whisker-deficient sites.

What is claimed is:

1. A process for the preparation of SiC whisker-reinforced ceramic composite materials which comprises the steps of:

a) adding about 0.4 to 1.0% by weight of a nonionic polymer, polyvinyl alcohol(PVA) to a heat-treated SiC whisker to obtain a SiC Whisker slurry;

b) mixing said SiC whisker slurry with a matrix slurry formed at about pH 4 followed by freeze-drying the resulting slurry mixture to produce granules having a uniform packing structure; and c) hot pressing said granules.

2. The process according to claim 1, wherein said heat-treated SiC whisker is obtained for maximum PVA adsorption by heat-treating as received SiC whisker in air or argon in an electric furnace at 500° C. to 700° C. for about one hour.

3. The process according to claim 1, wherein the step c) is carried out in argon at 1,650° C. to 1,800° C. and at 45 MPa for about 40 to 60 minutes.

4. The process according to claim 1, wherein the matrix slurry is Al$_2$O$_3$ or Al$_2$O$_3$/ZrO$_2$ slurry.

* * * * *